(12) United States Patent
Oda

(10) Patent No.: US 6,819,359 B1
(45) Date of Patent: Nov. 16, 2004

(54) METHOD AND APPARATUS FOR CONTROLLING THE PROCESSING OF SIGNALS CONTAINING DEFECTIVE PIXELS IN ACCORDANCE WITH IMAGING OPERATION MODE

(75) Inventor: Kazuya Oda, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/496,591

(22) Filed: Feb. 2, 2000

(30) Foreign Application Priority Data

Feb. 3, 1999 (JP) .......................................... 11-026128

(51) Int. Cl.[7] .......................... H04N 9/64; H04N 5/225
(52) U.S. Cl. .................... 348/247; 348/220.1; 348/246
(58) Field of Search .................. 348/241, 246, 348/247, 220.1, 333.11, 223.1, 252

(56) References Cited

U.S. PATENT DOCUMENTS

| | | | | |
|---|---|---|---|---|
| 4,480,636 A | * | 11/1984 | Karaki et al. ............... | 600/109 |
| 4,805,023 A | * | 2/1989 | Younse et al. .............. | 348/247 |
| 5,198,906 A | * | 3/1993 | Yamashita ................... | 348/246 |
| 5,223,921 A | * | 6/1993 | Haruki et al. ............... | 348/655 |
| 5,251,019 A | * | 10/1993 | Moorman et al. ........... | 348/275 |
| 5,381,175 A | * | 1/1995 | Sudo et al. .................. | 348/246 |
| 5,416,516 A | * | 5/1995 | Kameyama et al. ........ | 348/246 |
| 5,499,114 A | * | 3/1996 | Compton ..................... | 358/483 |
| 5,828,406 A | * | 10/1998 | Parulski et al. ........... | 348/220.1 |
| 5,838,371 A | * | 11/1998 | Hirose et al. .............. | 348/240.2 |
| 5,943,094 A | * | 8/1999 | Sakai et al. ................. | 348/243 |

FOREIGN PATENT DOCUMENTS

JP          A7143403         6/1995

* cited by examiner

Primary Examiner—Wendy R. Garber
Assistant Examiner—Timothy J. Henn
(74) Attorney, Agent, or Firm—Birch, Stewart, Kolasch & Birch, LLP

(57) ABSTRACT

A digital camera has a moving image mode in which display images are sequentially displayed on a color liquid crystal monitor and a still image mode in which a display image, captured in response to a release switch, is processed and recorded in a memory card. In the moving image mode, an analog signal processor performs previous-pixel-value interpolation for defective pixels. In the still image mode, calculation is made using data stored in a frame memory of a digital signal processor to perform interpolation for defective pixels.

8 Claims, 6 Drawing Sheets

Fig. 6

METHOD AND APPARATUS FOR CONTROLLING THE PROCESSING OF SIGNALS CONTAINING DEFECTIVE PIXELS IN ACCORDANCE WITH IMAGING OPERATION MODE

BACKGROUND OF THE INVENTION

1. Field of the Invention

The present invention relates to an apparatus for and a method of controlling imaging with defects in a captured image caused by defective photosensitive cells in an imaging device minimized. More specifically, the present invention relates to such an apparatus for and a method of performing appropriate defective-pixel correction so that improved-quality moving and still images are displayed and recorded, for example.

2. Description of the Background Art

Recently, a digital camera that has a solid-state imaging device, such as a CCD (Charge Coupled Device), is prevailing. The digital camera photo-electrically converts a subject image that falls on the array of photosensitive cells. For example, a digital camera, capable of recording still images onto a recording medium, compresses and codes a captured still image, converts the coded data to a predetermined format, and then records the data into a memory card composed, for example, of flash memory. Today, a digital camera can record a still image with an integration of 1,300,000 pixels, at the maximum.

With this type of still camera, it would be convenient if, prior to an actual shooting and recording, frames of image captured by the imaging device are sequentially displayed on the liquid crystal display panel of a viewfinder so as to enable shooting control, such as framing, exposure and focusing control, and auxiliary flashing, to be performed while monitoring the frames of image.

The image signal from the solid state imaging device sometimes inherently contains defective pixels caused by defective photosensitive cells which form pixels but fail to generate the electric charge corresponding to the amount of light incident thereto or in which a noise exceeding a predetermined level is generated due to an uneven dark current. When an image represented by the image signal is displayed, those defective pixels appear as white defects, black defects, or modulation defects in the display image, significantly decreasing the image quality.

To correct these defective pixels, the video camera disclosed in Japanese Patent Laid-Open Publication No. 143404/1995, for example, employs a defective pixel correction method. This method uses low-pass filters for the output produced by previous-pixel-value interpolation or uses only low-pass filters to correct defective pixels according to the relation between the defective pixel level and the threshold.

However, the conventional video camera, intended only for shooting and recording moving images or pictures, does not take account of correction processing for shooting and recording still images. For example, the above-described digital still camera, designed for shooting and recording high-resolution still images, must be able to perform precise pixel defect correction. In this case, still image correction requires a time long enough for correction because there are too many pixels to be processed.

In the movie mode in which the viewfinder function is implemented, it is difficult to spend a period of time in correcting defective pixels in moving images or motion pictures as long as in correcting defective pixels in still images. This is because moving images must be displayed almost in real time to allow processing, such as framing, to be performed. As a result, only intermittent frames would be processed if defective-pixel correction, as performed on still images, must be performed on moving images. This results in more lost frames, preventing moving images from being displayed continuously and making the monitor display unsuitable for deciding framing before shooting. Therefore, although appropriate defective-pixel correction is performed for still images recorded in a memory card, no defect correction is performed during movie mode operation. Defective pixels, which appear on the liquid crystal display panel as defects such as bright or dark dots, degrade the monitor display quality.

SUMMARY OF THE INVENTION

The present invention seeks to solve the problems associated with the prior art described above. It is therefore an object of the present invention to provide an apparatus for and a method of controlling imaging in which defective pixels due to defective photosensitive cells in the imaging device can be corrected to output improved-quality still images, even as well as improved-quality moving images for monitoring before shooting and recording.

To solve the above-mentioned problems, the present invention provides an imaging control apparatus for receiving an image signal output from an imaging device which photo-electrically converts an optical image formed by an imaging lens and outputting moving images and a still image represented by the image signal. The imaging control apparatus comprises a signal processor for processing the image signal; a storage circuit for storing therein defect information on defective pixels contained in the imaging device; an output circuit for outputting the image signal, processed by the signal processor to an operation mode; and a control circuit for controlling the imaging device, signal processor, and output circuit to set up the operation mode, the operation mode being one of a moving image mode in which the moving images are output and a still image mode in which the still image is recorded, the control circuit driving components in response to the setup to cause the moving images associated with the image signal to be output and to cause the still image associated with the image signal to be recorded in a recording medium, wherein the control circuit recognizes the defective pixels in the image signal based on the defect information and, based on the recognition result, controls the signal processor, and wherein, under the control of the control circuit, the signal processor calculates, in the still image mode, a value of a position of each of the defective pixels based on the values of the pixels adjacent to the defective pixel, replaces the value of the defective pixel with the calculated result, and outputs the image signal to the output circuit, and, in the moving image mode, replaces each of the defective pixels with the value of a previous pixel and outputs the image signal to the output circuit.

Furthermore, to solve the above problems, the present invention provides an imaging control apparatus for receiving an image signal output from imaging device which photo-electrically converts an optical image formed by an imaging lens and outputting moving images and a still image represented by the image signal. The imaging control apparatus comprises a signal processor for processing the image signal; a storage circuit for storing therein defect information on defective pixels contained in the imaging device; an output circuit for outputting the image signal, processed by the signal processor, according to an operation mode; and a control circuit for controlling the imaging device, signal processor, and output circuit to set up the operation mode, the operation mode being one of a moving image mode in which the moving images are output and a still image mode in which the still image is recorded, the control circuit driving components in response to the setup to cause the moving images associated with the image signal to be output and to cause the still image associated with the image signal to be recorded in a recording medium, wherein the control circuit recognizes the defective pixels in the image signal based on the defect information and, based on the recognition result, controls the signal processor, and wherein, under the control of the control circuit, the signal processor calculates, in the still image mode, a value of a position of each of the defective pixels based on the values of the pixels adjacent to the defective pixel, replaces the value of the defective pixel with the calculated result, and outputs the image signal to the output circuit, and, in the moving image mode, the image signal whose signal processing level at which the image signal is processed is made lower than the signal processing level in the still image mode to reduce an effect of the defective pixel is output to the output circuit.

Furthermore, to solve the above problems, the present invention provides a method of controlling imaging while receiving an image signal output from imaging device which photo-electrically converts an optical image formed by an imaging lens, and outputting moving images and a still image represented by the image signal. The imaging control method comprises the steps of storing defect information on defective pixels contained in the imaging device; processing the image signal; outputting the image signal processed in the step of processing the signal according to an operation mode; and controlling processing in the steps of imaging, processing the signal, and outputting to set up the operation mode, the operation mode being one of a moving image mode in which the moving images are output and a still image mode in which the still image is recorded. In the step of controlling, in response to the setup, the moving images associated with the image signal are output and the still image associated with the image signal is recorded in a recording medium. In the step of controlling, the defective pixels in the image signal are recognized based on the defect information and, based on the recognition result, the step of processing the signal is controlled. In the step of controlling, in the still image mode, a value of a position of each of the defective pixels is calculated based on the values of the pixels adjacent to the defective pixel and the value of the defective pixel is replaced with the calculated result, and, in the moving image mode, each of the defective pixels is replaced with the value of a previous pixel.

Furthermore, to solve the above problems, the present invention provides a method of controlling imaging while receiving an image signal output from imaging device which photo-electrically converts an optical image formed by an imaging lens and for outputting moving images and a still image represented by the image signal. The imaging control method comprises the steps of storing defect information on defective pixels contained in the imaging device; processing the image signal; outputting the image signal processed in the step of processing the signal according to an operation mode; and controlling processing in the steps of imaging, processing the signal, and outputting to set up the operation mode, the operation mode being one of a moving image mode in which the moving images are output and a still image mode in which the still image is recorded. In the step of controlling, components are driven in response to the setup to cause the moving images associated with the image signal to be output and to cause the still image associated with the image signal to be recorded in a recording medium. In the step of controlling, the defective pixels in the image signal are recognized based on the defect information and, based on the recognition result, the processing in the step of processing the signal is controlled. In the step of processing the signal, in the still image mode, a value of a position of each of the defective pixels is calculated based on the values of the pixels adjacent to the defective pixel, the value of the defective pixel is replaced with the calculated result, and the image signal is output, and, in the moving image mode, the image signal whose signal processing level at which the image signal is processed is made lower than the signal processing level in the still image mode to reduce an effect of the defective pixel is output.

BRIEF DESCRIPTION OF THE DRAWINGS

The objects and features of the present invention will become more apparent from consideration of the following detailed description taken in conjunction with the accompanying drawings in which:

FIG. 6 is a view similar to FIG. 2, useful for understanding an exemplified defect correction in the moving image mode of the embodiment.

DESCRIPTION OF THE PREFERRED EMBODIMENTS

Figure 1:
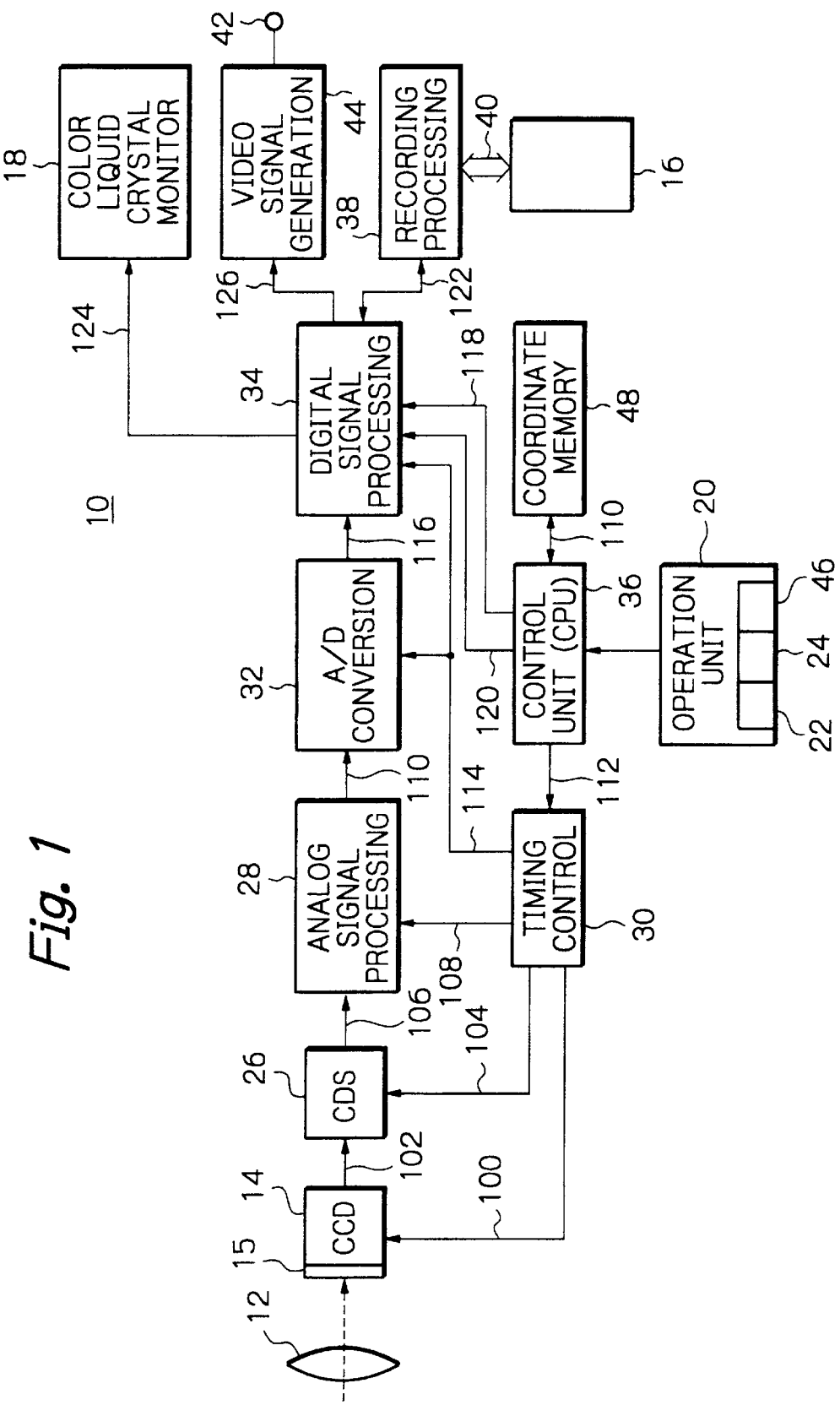
FIG. 1 is a schematic block diagram showing an embodiment of a digital camera to which the present invention is applied.

Referring to the accompanying drawings, an embodiment of an imaging control apparatus according to the present invention will be described in detail. FIG. 1 is a schematic block diagram of a digital still camera to which the present invention is applied. A digital still camera 10 is an imaging apparatus which processes the image signal of a subject field imaged by an imaging lens 12 and an imaging device 14, and then records data representative of a still image into a memory card 16 removably installed on the digital still camera 10. This digital still camera 10 has a movie function which continuously images the subject field, generates data representative of the moving images or pictures, and sequentially displays the image represented by the image data on a color liquid crystal monitor 18, functioning as a viewfinder.

More specifically, the digital still camera 10 has two modes: a still image mode in which image data representative of a high-resolution image is coded in a still image processing to be recorded into the memory card 16, and a moving image or motion picture mode in which a plurality of images are displayed on the monitor 18 continuously to establish the viewfinder function. When a release switch 22 on an operation unit 20 is turned on, the still image mode is activated for shooting and recording still images; when a display switch 24 on the operation unit 20 is turned on or when a display device such as an external monitor is connected to an output terminal 42 from which the moving image signal is output, the moving image mode is activated. In the moving image mode, the digital still camera 10 sequentially displays the image on the monitor 18 to allow the operator to make adjustment, such as focusing and framing, before shooting and recording the subject image with the use of continuous moving images. In the still image mode activated by the operator turning on the release switch, the camera processes a high-resolution still image, composed of one or more frames shot after framing in the moving image mode, and records the image into the memory card 16. This digital still camera 10 is specifically adapted to appropriately correct defective pixels due to defective photosensitive cells included in the imaging device 14 through corrective processing that is performed according to the moving image mode or still image mode, and then records or displays the corrected images. In the description given below, the components not directly associated with the present invention will neither be shown nor described. In addition, the signals will be designated by the reference numbers of connection lines on which they are conveyed.

Figure 2:
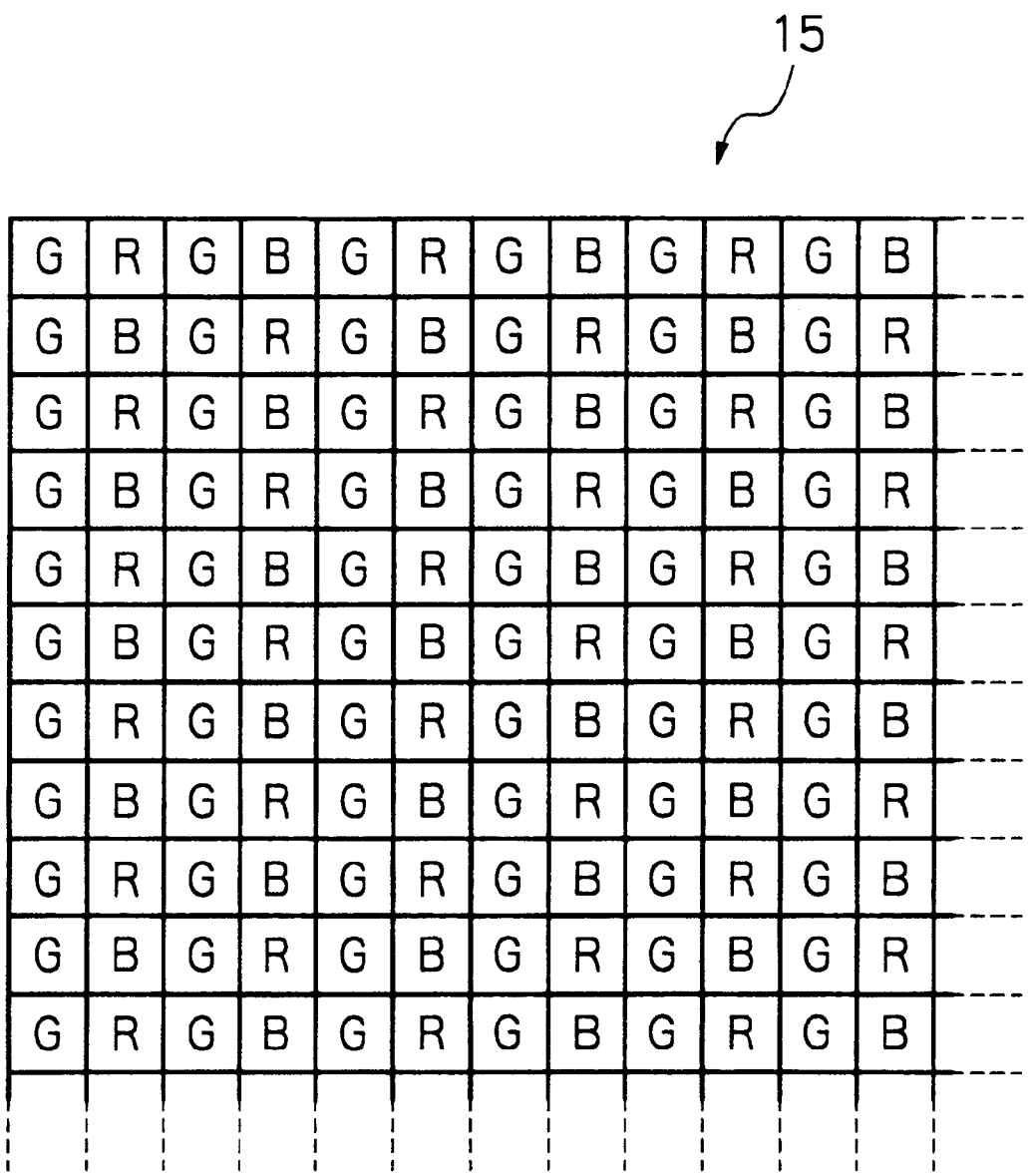
FIG. 2 schematically shows the filter array of an imaging device in the embodiment shown in FIG. 1.

The digital still camera 10 has the imaging device 14 that converts a subject image, formed by the subject-pointing imaging lens 12, into a corresponding electric signal. The imaging surface, or photosensitive array, of the imaging device 14 is covered with a primary-color filter 15 that is a G-striped R/B complete check pattern, in the embodiment. FIG. 2 shows a part of the imaging surface. The imaging device 14 is a high-pixel-density interline transfer CCD imaging device with about 1,300,000 to 1,500,000 pixels thereon, for example. The imaging device 14 is a two-dimensional image sensor comprising a photosensitive part composed of a plurality of photo-diodes horizontally and vertically arranged for forming pixels, vertical transfer CCDs that transfer charges generated by the photo-diodes into the vertical direction, horizontal transfer CCDs that transfer the charges sent from the vertical transfer CCDs, and an output amplifier that converts the charge transferred by the horizontal transfer CCDs into an electric signal.

The imaging device 14 usually contains defective photosensitive cells, or pixels, caused during manufacturing. A pixel with a defect whose defective level is higher than that of a normal pixel is treated as a defective pixel. The manufacturer of the imaging device 14 supplies coordinate data indicating the defective pixel positions on the imaging plane of the photosensitive array. This coordinate data is stored in a coordinate memory 48 connected to a control unit 36 that will be described later. Instead of using this supplied coordinate memory, when the imaging device 14 is incorporated into the digital still camera 10 while manufacturing, defective pixel position data may be created specifically for the imaging device 14 and stored in the coordinate memory 48.

In response to the drive signal from an input 100, the imaging device 14 generates a charge according to the amount and exposure time of light going through the primary-color filter 15 and focused on the photo diodes. It outputs the electric signal, generated according to the charge, to an output 102 as the RGB dot-sequential image signal. In the moving image mode, the imaging device 14 in this embodiment extracts every other pixel horizontally and vertically (decimate to one-half) in response to the input drive signal 100, reads 480×640-RGB pixel signal that may be displayed on the monitor, and outputs the moving image signal, whose one frame is composed of a couple of interlaced fields, to the output 102. On the other hand, in the still image mode, the imaging device 14 reads all pixels, generates the 1024×1280 RGB pixel signal, and outputs it for each frame. In this way, the imaging device 14 in this embodiment, driven differently according to the mode, quickly outputs moving images for display on the monitor. Instead of the above method, a digital signal processing unit 34, which will be described later, may perform decimation to create an image with a size appropriate for display on the monitor if all pixels may be read quickly.

The output 102 from the imaging device 14 is sent to a correlated double sampling (CDS) circuit 26. The correlated double sampling circuit 26 is a front-end amplifier circuit that performs correlated double sampling for the image signal received via the input 102 in synchronization with a pixel clock 104 supplied from a timing control unit 30 and removes the reset noise from the signal output from the imaging device 14.

Figure 5:
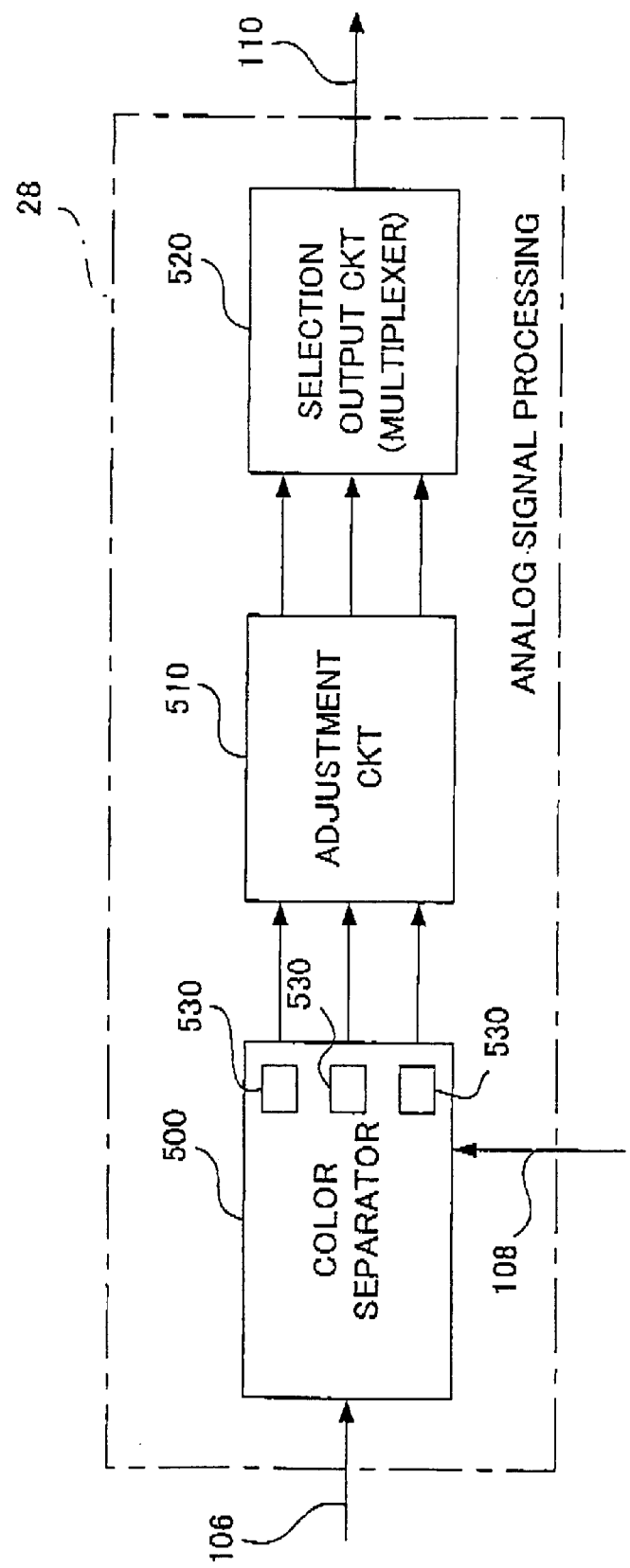
FIG. 5 is schematic block diagram showing a specific configuration of analog signal processing included in the camera shown in FIG. 1.

An analog signal processing unit 28 connected to an output 106 of the CDS circuit 26 has three components as shown in FIG. 5: a color separator 500 that, in response to a color separation pulse 108 supplied from the timing control unit 30, separates the image signal RGB dot-sequentially into three lines according to the color component, a balance adjustment circuit and a gamma correction circuit 510 that adjust the level of the color component signal generated as a result of color separation, and a multiplexer 520 that combines three color component signals into one. The analog signal processing unit 28 performs analog signal processing, such as signal adjustment and correction, in response to the control signals such as the pixel clock signal and the color separation pulse 108. The color separation circuit, in turn, has a sample and hold circuit 530 for each color component. This sample and hold circuit 530 comprises a switch, which is adapted to sample the pixels of the primary color signal generated as a result of color component separator 500, and a hold capacitor. If a defective pixel is going to be processed when the dot-sequentially-received image signal is separated into three colors in the moving image mode, the sample and hold circuit 530 stops the sampling of a defective pixel in response to the color separation pulse 108 supplied from the timing control unit 30 and, instead, outputs the pixel value that has been held, that is, the value of the previous pixel. In the still image mode, the color separator 500 sequentially samples all pixels to separate the pixel signal into three lines in response to the color separation pulse that is output to the pixels of the color components.

As described above, the signal processing unit 28 in this embodiment has the previous-pixel-value interpolation function that replaces a defective pixel value with the previous pixel value of the same-component color. After previous-pixel-value interpolation, the analog signal processing unit 28 switches RGB signals, for example, once for each horizontal scanning period to multiplex them into one line and sequentially supplies the one-line signal to an A/D conversion unit 32 connected to an output 110.

The timing control unit 30 that supplies the color separation pulse 108 generates various clock pulses and drive signals according to the mode set up by the control unit 36 and supplies those signals to each unit. This timing control unit 30 generates the color separation pulse, which controls the sampling time in the color separation circuit in the moving image mode, according to the position information 112 on defective pixels supplied from the control unit 36.

When the color of a defective pixel is going to be separated, the timing control unit 30 outputs the color separation pulse that stops the sampling of the pixel and, at the same time, allows the value of the previous pixel that has been held to be maintained. This color separation pulse 108 prevents the analog signal processing unit 28 from sampling the value of the defective pixel for the component signals that have been separated into three colors. Instead, the color separation pulse 108 allows the previous-pixel-value interpolation to be performed to output the previous pixel value again.

The A/D conversion unit 32 connected to an output 114 of the timing control unit 30 is an analog-to-digital conversion unit that converts the image signal input to the input 110 to a digital signal composed of a predetermined number of bits. In response to the control signal 114 such as the A/D clock signal or synchronization signal supplied from the timing control unit 30, the A/D conversion unit 32 in this embodiment sequentially converts the pixel signals of the color components, which are switched for each horizontal scanning period, into digital values each composed of 8 bits or 10 bits. An output 116 of the A/D conversion unit 32 is connected to the digital signal processing unit 34.

The digital signal processing unit 34 is adapted to process various input digital signals in response to a control signal 118 from the control unit 36. The digital signal processing unit 34 has a frame memory in which the RGB image signal is stored temporarily. When the still image mode is set, the digital signal processing unit 34 performs correction processing for correcting the color balance, luminance, and chroma saturation of the image data stored in the frame memory according to the signal processing parameters of the still image mode. In addition, the digital signal processing unit 34 performs digital signal processing, such as filtering and edge enhancement, for creating correct still images.

In the still image mode, the digital signal processing unit 34 executes the YC separation function. This function separates the RGB primary color image data into luminance data Y and color difference data C. In the moving image mode, the digital signal processing unit 34 supplies the YC-converted YC data to a video signal generation unit 44. In addition, the digital signal processing unit 34 supplies RGB image data to the monitor 18. In the still image mode, the digital signal processing unit 34 in this embodiment converts the image data to YC data according to the compression coding system used in a recording processing unit 38. The recording processing unit 38 compresses and codes luminance data Y and color difference data C. The digital signal processing unit 34 also has the pixel interpolation function which represents the pixels as one of the three primary colors according to the array on the primary color filter 15 of the imaging device 14. This pixel interpolation function performs interpolation processing to generate one RGB pixel from the R, G, and B primary colors on the imaging device 14.

Furthermore, the digital signal processing unit 34 has the defective-pixel correction function that corrects defective pixels in the still image mode. This function performs interpolation processing with the use of a plurality of pixels surrounding a defective pixel to produce a complete, still image with the defect pixels corrected. More specifically, the digital signal processing unit 34 uses position information 120, supplied from the control unit 36 based on the coordinate data on the defective pixels stored in the coordinate memory 48 that will be described later, to perform pixel interpolation by replacing the value of a defective pixel with the value calculated based on the values of the surrounding pixels of the same-component color. For example, the digital signal processing unit 34 obtains the average of the values of the same-color component pixels adjacent (above, below, left, and right) to the defective pixel temporarily stored in the frame memory, and writes the resulting average in the storage position of an address where the defective pixel is stored to compensate for the data of the defective pixel. From the frame memory, the digital signal processing unit 34 reads out one-frame still image data created as described above and outputs it to the recording processing unit 38 connected to an output 122.

In the moving image mode, the digital signal processing unit 34 does not perform the defective-pixel correction processing directed to a still image as described above, but instead, the digital signal processing unit 34 converts image data, for which previous-pixel-value interpolation was performed by the analog signal processing unit 28, to the RGB signal for the monitor and outputs the signal to an output destination, for example, the color liquid crystal monitor 18 connected to an output 124 or the video signal generation unit 44 connected to an output 126.

In addition, before processing the image signal to be recorded into the memory card 16, the digital signal processing unit 34 calculates from the image data an evaluation value to be used for imaging control such as exposure adjustment and focus position adjustment of the imaging lens 12. The digital signal processing unit 34 passes the resulting value to the control unit 36. Based on the calculated evaluation value, the control unit 36 controls the imaging device 14, analog signal processing unit 28, and digital signal processing unit 34 to perform imaging control.

As described above, the digital signal processing unit 34 performs interpolation on the still image signal stored in the frame memory to create the RGB signal of the pixels and executes YC separation to separate the created RGB signal into the luminance signal and the color difference signal. The digital signal processing unit 34 outputs the processed YC image data from the output 122.

The recording processing unit 38 develops coded data to be recorded into the memory card 16 that is removably connected to a connector 40. The processing unit 38 controls the read/write operation on the image data and coded data of still images. The recording processing unit 38 in this embodiment uses a compression coding system such as the JPEG system to code the image signal passed via the input 122 to generate a predetermined length of coded data, converts the coded data into a format compatible with a recording medium such as the memory card 16, and writes the converted coded data into the memory card 16. The recording processing unit 38 also reads out data from the memory card 16, decodes the data, and supplies the decoded image data to the digital signal processing unit 34. In this case, the digital signal processing unit 34 converts the still image data, supplied from the recording processing unit 38, into a signal format compatible with the color liquid crystal monitor 18 or the video signal generation unit 44, and outputs the data to the output 124 and the output 126.

In the moving image mode, the digital signal processing unit 34 receives the field signal of the image signal from the A/D conversion unit 32 and generates the image data in compliance with the destination of the moving images. When the display switch 24 is turned on in the moving image mode, the digital signal processing unit 34 supplies the processed image data to the color liquid crystal monitor 18. When the digital signal processing unit 34 detects that some other type of display is connected to the output terminal 42, the processing unit 34 outputs image data to the output terminal 42. In the moving image mode, the digital signal processing unit 34 does not perform defective pixel correction that is to be performed in the still image mode. Instead, the digital signal processing unit 34 outputs image data composed of reduced number of pixels, sequentially outputs the continuous frames of the image, and displays naturally-viewed images on a display unit such as the color liquid crystal monitor 18 or the video signal generation unit 44. Also, in the moving image mode, the digital signal processing unit 34 calculates an evaluation value for use in shooting control and supplies the calculated evaluation value to the control unit 36 for adjusting the image brightness and focus. This allows the image to be displayed on the color liquid crystal monitor 18 under appropriate shooting control, making it possible for the operator to do appropriate framing and so on.

In this case, even if a defective pixel is included in the display data, the previous-pixel-value interpolation function replaces the pixel in the defective pixel position with the value of the previous normal pixel, thus preventing the defective pixel from being displayed as a bright dot or a dark dot in the moving image display. The digital still camera 10 in this embodiment, which has the electronic viewfinder function as described above, may also be provided with an optical viewfinder to enable the operator to do framing even when the display switch 24 is turned off to suppress the display of moving images for monitoring. In this case, when the mode is set up not to display or output moving images, the defective pixel correction function of the analog signal processing unit 28 may be stopped in the moving image mode and, instead, normal sampling may be performed. Instead of gamma correction and color balance adjustment executed by the analog signal processing unit 28, the digital signal processing unit 34 may perform the correction and adjustment.

The video signal generation unit 44 connected to the output 126 of the digital signal processing unit 34 is a signal conversion unit for producing the image signal of moving images and a still image. The generated signal is compatible in format with the signal to be input to a display device connected to the output terminal 42. The video signal generation unit 44 in this embodiment outputs the NTSC video signal to the output terminal 42 according to the type of video output device such as a monitor device connected to the output terminal 42. The digital signal processing unit 34 may have a digital output terminal from which the digital image signal is output. For example, in an application in which the digital signal processing unit 34 has a serial input/output terminal or a parallel input/output terminal to or from which continuous frames of moving image data are input or output, the processing unit 34 is adapted to convert the moving image signal, for which defective pixel correction has been performed by the analog signal processing unit 28, to a format compatible with the connected input/output terminal.

The control unit 36 is adapted to set up one of two modes alternatively: moving image mode and still image mode. The control unit 36 sets up the moving image mode when the display switch 24 is turned on; the control unit 36 sets up the moving image mode when it detects that a display device capable of displaying moving images thereon is connected. The control unit 36 also sets up the still image mode when it detects that the release switch 22 is turned on. The control unit 36 may be initialized such that it sets up the moving image mode when a power switch on the operation unit 20 is turned on to supply power to the components of the camera. In an application where the release switch 22 is a two-stroke switch, the switch may be adapted to set up adjustment (focusing, exposure, and white balance adjustment) in its first stroke, and shift the operational mode to the still image mode in its second stroke.

When the control unit 36 sets up the moving image mode, the timing control unit 30 generates the drive signal to read out data from the imaging device 14 in the decimation read mode. At the same time, based on the position information supplied from the control unit 36, the timing control unit 30 supplies the color separation pulse 108 to the analog signal processing unit 28 to inhibit sampling when color separation of a defective pixel is going to be performed. In the still image mode, the control unit 36 sends to the digital signal processing unit 34 the position information associated with to the defective pixel coordinate data recorded in the coordinate memory 48. Upon receiving this information, the digital signal processing unit 34 uses the values of the surrounding pixels to perform interpolation for the pixel value of the memory address associated with the position information. In this way, the digital signal processing unit 34 corrects defective pixels in the still image mode. The control unit 36 controls defective pixel correction in the display image based on the coordinate data.

More specifically, in the moving image mode, the control unit 36 checks the defective pixel position information indicated by the coordinate data and, based on this checking, outputs the correction control signal, which specifies when to inhibit sampling, to the timing control unit 30. Upon receiving the correction control signal in the moving image mode, the timing control unit 30 stops the output of the color separation pulse 108 for the corresponding pixel to cause the analog signal processing unit 28 to stop sampling. In this way, the timing control unit 30 inhibits the sampling of the defective pixel and maintains the hold state. Then, when the next pixel is output, the timing control unit 30 outputs the hold voltage to repeat the previous pixel value. For other normal pixels, the timing control unit 30 outputs the usual color separation pulse for each color component.

In this embodiment, the timing control unit 30, analog signal processing unit 28, and digital signal processing unit 34 work in cooperation to perform the previous-pixel-value interpolation function and the complete interpolation function for the moving image mode and the still image mode as described above. These functions perform appropriate processing according to the operation mode to display correct moving images and still images.

In this embodiment, defective pixel coordinate data is stored in the coordinate memory 48, and defective-pixel correction is performed for the pixels corresponding to the coordinate data. It should be noted that defective-pixel correction is not limited to this method. For example, in the moving image mode, the analog signal processing unit 28 may perform previous-pixel-value interpolation only for coordinate data corresponding to the image signals that will be displayed on the monitor. That is, in the moving image mode, the control unit 36 may omit defective-pixel correction for pixels that will be decimated because of the image display size. To do so, the coordinate data on moving images and the coordinate data on still images are stored separately in the coordinate memory 48 to allow the coordinate data to be selected for defective pixel correction according to the mode.

When the digital signal processing unit 34 decimates pixels to adjust the number of pixels to the display size of the image monitor instead of sending the decimation drive signal to decimate pixels at the time data is read out from the imaging device 14 or when the digital signal processing unit 34 zooms in or out the image digitally, it performs pixel interpolation or decimation with the still image frame data stored in the frame memory of the digital signal processing unit 34. In this case, if a pixel at the coordinates to be used for interpolation or decimation is defective, the digital signal processing unit 34 performs previous-pixel-value interpolation described above. Depending upon the degree at which the image is zoomed in or out, previous-pixel-value interpolation may or may not be performed for a defective pixel at particular coordinates.

The operation of the digital still camera 10 in this embodiment, which has the configuration described above, will be described. First, operating a power switch 46 supplies power to the components of the digital still camera 10. In the initial state immediately after power-on, the digital still camera 10 is in one of operation modes, such as a shot mode or a reproduction mode, that is selected via the dial switch. When the shoot mode is selected, the camera temporarily enters the standby state. In this state, neither the moving image mode nor the still image mode is activated. Turning on the release switch 22 places the camera in the still image mode to enable still images to be recorded into the memory card 16.

In the standby state, the control unit 36 recognizes coordinate data stored in the coordinate memory 48. When the moving image mode is activated, the control unit 36 informs the timing control unit 30 of position information corresponding to the coordinate data. The moving image mode is activated when the display switch 24 is turned on or when it is detected that an external unit is connected to the output terminal 42. When the control unit 36 sets up the still image mode in response to the release switch 22, it informs the digital signal processing unit 34 of the memory address corresponding to the coordinate data.

When the mode is changed to the moving image mode, the color image signal 106 imaged by the imaging device 14 is sent RGB-dot-sequentially to the analog signal processing unit 28. The image signal sent to the analog signal processing unit 28 is sampled and held in response to the color separation pulse 108 supplied from the timing control unit 30 and then separated into three color component lines, R, G, and B. The level of each three-line component image signal is adjusted; that is, the offset, white balance, and the gamma (γ) are adjusted.

Figure 6:
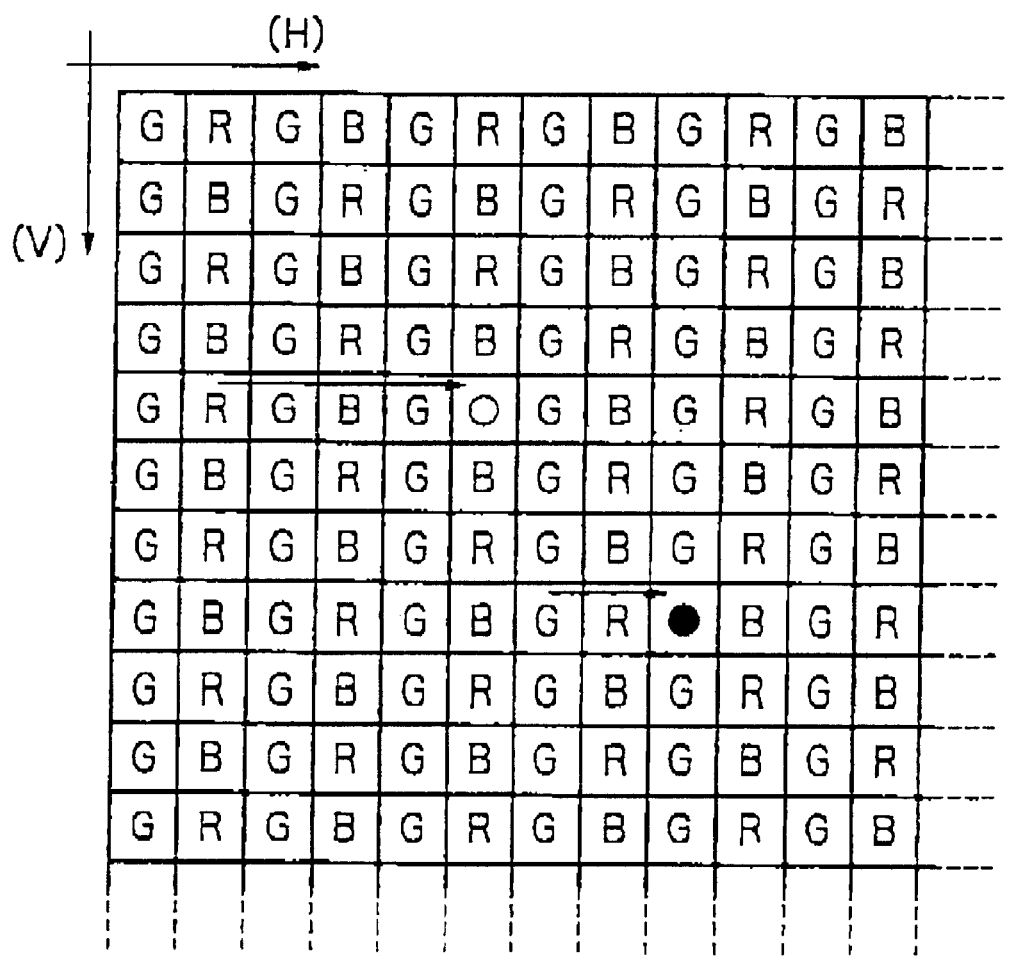

At the time color separation is performed, the timing control unit 30 receives position information from the control unit 36. When color separation is going to be performed on a pixel indicated by the position information, the timing control unit 30 temporarily stops pixel sampling and holds the value of the previous pixel. As a result, the pixel indicated by the position information is not sampled but is replaced with the value of the previous same-color component pixel that was sampled and held immediately before. In this way, previous-pixel-value interpolation is performed in this embodiment for each color component, and a defective pixel, when detected, is replaced with the value of the previous pixel as shown in FIG. 6. The image signal for which previous-pixel-value interpolation is performed is level-adjusted and then multiplexed into one line by the multiplexer for transmission to the A/D conversion unit 32. The image signal received by the A/D conversion unit 32 is converted to digital and sent to the digital signal processing unit 34.

The image data received by the digital signal processing unit 34 is adjusted in size by decimating pixels so that the size becomes compatible with the monitor 18. The frames of image data are generated and sent to the monitor 18, one frame at a time. In this way, the video picture representative of the moving image of the subject is displayed on the monitor 18. On the other hand, when an external device is connected to the output terminal 42, the digital signal processing unit 34 adjusts the image to a size necessary to generate NTSC video signals. The adjusted image data is converted to analog data to which the synchronization signal and other necessary signal are added. The video signal thus produced is sent to the external device connected to the output terminal 42. At the same time, the shutter speed, f-number, imaging lens focus position, and so on are controlled by the focus adjustment and exposure control data sent from the control unit 36.

With the camera in the state described above, the operator adjusts the camera position so that a desired subject comes into the imaging range for proper framing. When the operator finds the subject in a desired framing state and depresses the release switch 22, the digital still camera 10 moves to the still image mode. In the still image mode, the image signal 102 representative of one frame of image is output from the imaging device 14, correlated-double-sampled by the CDS circuit 26, and sent to the analog signal processing unit 28. In the still image mode, the timing control unit 30 sends the normal sampling pulse to the analog signal processing unit 28 for use in three-line separation and other level adjustment.

Figure 3:
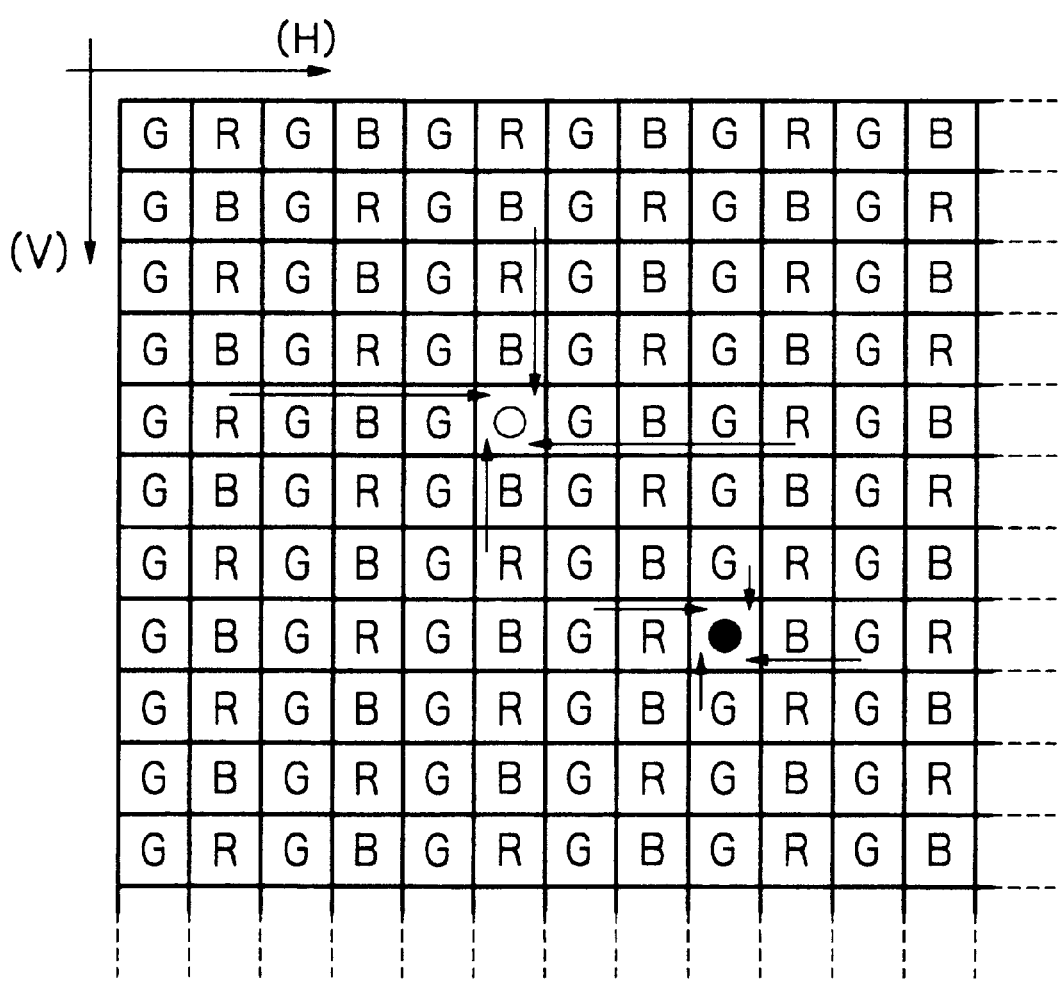
FIG. 3 is a view, similar to FIG. 2, useful for understanding an exemplified defect correction in the still image mode of the embodiment.

The image signal processed in the analog mode as described above is multiplexed into one line and sent to the A/D conversion unit 32 for conversion to the digital signal. The converted digital signal received by the digital signal processing unit 34 is once stored in the frame memory. At this time, the control unit 36 sends memory addressees, each corresponding to coordinate data read out from the coordinate memory 48, to perform interpolation on the addresses arranged as an array similar to the color filter array provided on the imaging device. More specifically, as shown in FIG. 3, when the digital signal processing unit 34 performs interpolation for a defective R pixel a that will become a bright or white spot and a detective G pixel b that will become a dark or black spot, it calculates the average of the values of the adjacent same-color-component pixels and writes the average value into the memory as the value of the target pixel. In this way, the digital signal processing unit 34 updates the value of a defective pixel with the average value of the pixels adjacent to the defective pixel.

For the defective R pixel a shown in the figure, the digital signal processing unit 34 estimates the value of the target pixel by using four pixels: two R pixels adjacent horizontally and two R pixels each two lines above and below the target pixel. To estimate the value, a weighted average or a simple average, based on the distance between the pixels, may be used. For the defective G pixel b, the digital signal processing unit 34 also estimates the value of the target pixel by using four pixels: two G pixels adjacent horizontally and two G pixels adjacent vertically. In this embodiment, the average value of four adjacent pixels are used as the value of the target pixel. It should be noted that the present invention is not limited to this method. For example, one adjacent pixel of the same color component or the average of the values of two or three adjacent pixels of the same color component may be used. In addition, depending upon the situation, the adjacent pixels of the same color need not be referenced. When the defect is serious, different colors may be referenced to correct the defective pixel. This applies not only to the still image mode but to the moving image mode. Interpolation in the still image mode may take, in some degree, a longer period of time than in the movie mode. However, considering an effect on the video image displayed on the monitor or on the processing time, the interpolation precision and the interpolation method should preferably set up.

Once interpolation in the still image mode is completed, the image data is read out from the frame memory and output to the recording processing unit 38. Under the control of the control unit 36, the recording processing unit 38 compresses the image data and writes the compressed data into the storage area of the memory card 16 in a predetermined format. At the same time, the image data stored in the frame memory is output to the output 124 and the output 126, and the recorded image is displayed on the monitor 18 so that the operator can confirm it. At this time, when an external device is connected to the output terminal 42 of the video signal generation unit 44, the video signal represented by the image data is developed and supplied to the external device. In the reproduction mode, the frame with a desired frame number is read out from the coded data recorded in the memory card 16, decoded by the recording processing unit 38, and sent to the digital signal processing unit 34. The decoded image data is sent to the monitor 18 and the video signal generation unit 44 in the same manner as when the image is shot and recorded in the still image mode.

In the above embodiment, the generation of the sampling pulses for color separation (color separation pulse) is stopped when a defective pixel is processed to cause the analog signal processing unit 28 to stop the sampling of the defective pixel. It should be noted that the present invention is not limited to this method. For example, the timing control unit 30 may be configured so that the control unit 30 stops the AD clock pulse to be supplied to the A/D conversion unit 32 when the target pixel is processed. In this case, the timing control unit 30 holds continuously it output signal state to the analog-to-digital conversion in the moving image mode. Because the A/D conversion unit 32 receives one multiplexed image signal, a pixel referenced during previous-pixel-value interpolation may be a pixel of some other color component depending upon how the filter array is arranged. In the moving image mode, however, the A/D conversion unit 32 may output image data representative of a video image in which the defect has been corrected. In addition, when a defect is corrected in the moving image mode, previous-pixel-value interpolation may be performed only for pixels whose defect level exceeds a predetermined level.

The digital still camera used in this embodiment switches the defective-pixel correction method between moving images and a still image as described above. The camera performs simple interpolation even in the moving image mode and thus prevents the image quality from being degraded due to defective pixels with no additional processing load both in movie display mode and still picture shooting mode.

The embodiment shown in FIG. 1 performs defective-pixel correction according to the operation mode. More specifically, in the moving image mode, it performers simple previous-pixel-value interpolation; in the still image mode, it performs interpolation in which a pixel value stored in the frame memory is replaced with a value calculated using other pixel values. However, the present invention is not limited to this method. For example, instead of the above-described previous-pixel-value interpolation, a method of decreasing an adverse effect caused by defective pixels may be employed especially in the moving image mode.

Figure 4:
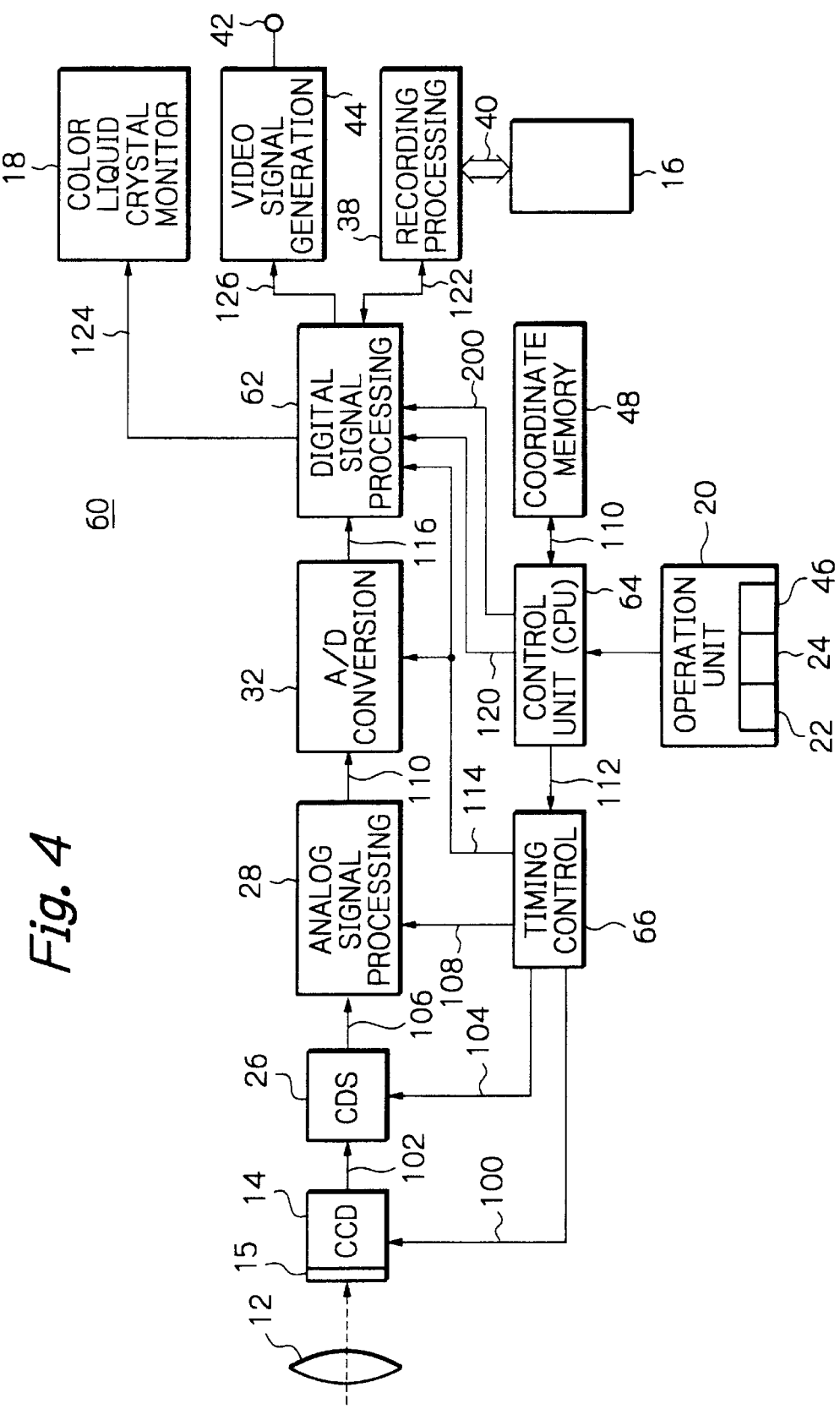
FIG. 4 schematic diagram, similar to FIG. 1, showing an alternative embodiment of the digital camera to which the present invention is applied.

Referring to FIG. 4, in an alternative embodiment of the digital still camera, the camera is not adapted to cause the analog signal processing unit 28 and the A/D conversion unit 32 to stop sampling in order to perform previous-pixel-value interpolation. In the moving image mode, the digital still camera 10 in this embodiment controls a digital signal processing unit 62 such that the edge enhancement level in the moving image mode becomes lower than that in the still image mode. In the description given below, the like components in FIG. 4 are designated with the same reference numerals as in FIG. 1, and the description of those components are not repeated. Only the different elements will be described.

A digital still camera 60 has the digital signal processing unit 62 that processes image data 116 output from the A/D conversion unit 32. In response to a control signal 200 from a control unit 64, the digital signal processing unit 62 performs digital signal processing for the image data 116 in the same manner as the digital signal processing unit 34 in the embodiment shown in FIG. 1. This digital signal processing unit 62 has a frame memory in which the RGB image signal is temporarily stored. When the still image mode is set up, the digital signal processing unit 62 performs correction for the image signal stored in the frame memory to correct the color balance, brightness, and chroma saturation according to the signal processing parameters prepared for the still image mode. The digital signal processing unit 62 also executes digital signal processing, such as filtering and edge enhancement, for the image signal to develop an appropriate still image.

In particular, the digital signal processing unit 62 has the image quality adjustment function, such as the aperture correction function, which corrects the image quality characteristic of the image data. The function extracts the outline of an image and varies the level of edge enhancement according to the control signal 200. In the moving image mode, the digital signal processing unit 62 uses a lower level of edge enhancement than that used in the still image mode or does not use enhancement at all. The enhancement is performed according to the parameters included in the control signal 200 supplied from the control unit 64. Therefore, when a defective pixel is going to be processed, a timing control circuit 66 does not inhibit sampling during color separation. The timing control circuit 66 supplies the drive signals 100 and 104, responsive to the operation mode set up by the control unit 64, to the imaging device 14 and the CDS circuit 26 to prevent previous-pixel-value interpolation from being performed.

The control unit 64 which controls the operation of the components sets up the parameter 200, required primarily by the digital signal processing unit 62 to perform edge enhancement processing, and supplies it to the digital signal processing unit 62. The control unit 64 in this embodiment switches the parameter 200 according to the operation mode: moving image mode or still image mode. In the moving image mode, the control unit 64 generates the parameter 200 specifying an edge enhancement level lower than that used in the still image mode to do lower-level edge enhancement in the moving image mode. This prevents a defective pixel appearing in the edge of the image from being enhancement.

In addition, when the digital signal processing unit 62 performs color correction, the control unit 64 may use a color saturation level in the moving image mode that is lower than in the still image mode to display moving image video lower in color saturation than in the still image mode. This is especially effective when a defective pixel is made conspicuous by the corresponding color filter.

In this embodiment, the operation may be changed according to the mode by changing the parameter used by the digital signal processing unit 62 for signal processing. However, it should be noted that the present invention is not limited to this method. For example, in the moving image mode, the defective pixel position in the imaging device 14 may be matched with the display position on the monitor 18 at which the defective pixel is displayed to force the display level of the pixel at the defective pixel position on the monitor 18 to change, for example, to an intermediate value. This allows only the display pixels corresponding to the defective pixels to be adjusted to an intermediate brightness or to achromatic color.

In the embodiment described above, the control parameter for image correction, such as edge enhancement or color saturation, directly associated with the appearance of defective pixels is changed, in the moving image mode, to the parameter that is lower in level than that of the parameter used in the still image mode. The parameter is passed to the signal processing unit to reduce the effect of the defects. As a result, the image appropriately interpolated by the pixels adjacent to the defective pixel is recorded in the memory card 16, and the video in which defects are not conspicuous is displayed on the monitor 18 in the moving image mode. For a camera in which the analog signal processing unit 28 performs pixel value conversion such as edge enhancement, the signal processing parameter corresponding to the operation mode may be supplied to the analog signal processing unit 28 to reduce the effect of the defect caused by defective pixels.

In the above embodiments, a video image is displayed in the moving image mode and an image is recorded in the memory card 16 in the still image mode. The present invention is not limited to this operation mode. For example, when a recording medium on which moving image data may be recorded is installed on the recording processing unit 38, the video image produced in the moving image mode may be recorded on the recording medium.

As described above, the digital still camera in accordance with the present invention allows the method of correcting the pixel value of a defective pixel in the imaging device to be switched to one of two operation modes - - - the moving image mode in which movie display is possible and the still image mode in which a still image is recorded - - - thereby giving a good-quality video and image. In the moving image mode, the camera performs previous-pixel-value interpolation based on the defective pixel address without reducing the frame data transfer speed. In the still image mode, the camera performs pixel interpolation to minimize the adverse effects caused by defective pixels and to give good-quality still images. The camera therefore can produce appropriately-processed image data in both modes. Moreover, in the moving image mode, the processing parameter for enhancement the image characteristics may be reduced in their level to prevent the defective pixels in the video displayed on the display device from becoming conspicuous and thus minimizes the effect of the defects. In this way, the digital still camera according to the present invention, though simple in configuration, controls the correction of defective pixels detected in the imaging device, and produces corrected images in dependent upon the operation mode that varies according to how the components such as an imaging device and a signal processor are driven.

The entire disclosure of Japanese patent application No. 26128/1999 filed on Feb. 3, 1999 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. An imaging control apparatus for driving an imaging device for photo-electrically converting an optical image formed by an imaging lens, receiving an image signal produced by the imaging device, and outputting moving images and a still image represented by the image signal, said apparatus comprising:

a pre-processor for correlated-double-sampling the image signal to produce an analog image signal;

a first signal processor for processing the analog image signal in accordance with an imaging operation mode, and converting the analog image signal processed to a digital image signal to output the digital image signal;

a storage circuit for storing therein defect information on defective pixels contained in said imaging device;

a second signal processor for receiving the digital image signal, and processing the digital image signal in accordance with the imaging operation mode; and a control circuit for controlling said imaging device and said first and second signal processors to set up the imaging operation mode, said operation mode being one of a moving image mode in which the moving images are output and a still image mode in which the still image is output, said control circuit driving components in accordance with the setup imaging operation mode to cause the moving images associated with the image signal to be output and to cause the still image associated with the image signal to be output, wherein said control circuit recognizes the defective pixels in the image signal based on the defect information and, based on the recognition result, controls said first and second signal processors, under the control of said control circuit, said first signal processor performing, in the moving image mode, a signal processing of previous-pixel value interpolation on the defective pixels in each color component to produce the digital image signal, under the control of said control circuit, said second signal processor calculating, in the still image mode, a value of a position of each of the defective pixels based on the values of the pixels in the vicinity of the defective pixel, and replacing the value of the defective pixel with the calculated result, to thereby interpolate the digital image signal.

2. The apparatus according to claim 1, wherein said first signal processor comprises:

a first color separator for sampling, in response to a color separation pulse, the image signal output from said pre-processor and for separating the image signal into color component signals of each color component;

a first adjustment circuit for adjusting levels of the color component signals separated by said first color separator; and a first selection output circuit for outputting the color component signals, processed by said first adjustment circuit, into a one-line signal, said control circuit generating, when the color of said defective pixel is going to be separated in the moving image mode, the color separation pulse inhibiting the sampling of the defective pixel, and supplying the color separation pulse to said first color separator circuit, said first color separator holding, when the color of the defective pixel is going to be separated, the previous pixel of the defective pixel in response to the color separation pulse supplied from said control circuit and supplying the held value to said first adjustment circuit as the value of the defective pixel.

3. The apparatus according to claim 1, wherein said first signal processor comprises:

a second color separator for sampling, in response to a color separation pulse, the image signal output from said pre-processor and for separating the image signal into color component signals of each color component;

a second adjustment circuit for adjusting levels of the color component signals separated by said second color separator;

a second selection output circuit for outputting the color component signals, processed by said second adjustment circuit, into a one-line signal; and a converter for converting an output from said second selection output circuit to a digital value to output the digital image signal, said converter samples the image signal in response to a clock pulse supplied from said control circuit and converts the sampled value to a digital value for output, said control circuit generating, when the defective pixel is going to be converted in the moving image mode, the clock pulse for stopping the sampling of the defective pixel and supplying the clock pulse to said converter, said converter converting, in response to the clock pulse in the moving picture mode, the held value of the previous pixel of the defective pixel to the digital value, and supplying the digital value as the digital image signal to said second signal processor without sampling the defective pixel.

4. The apparatus according to claim 1, further comprising an output circuit for outputting the digital image signal processed by said second signal processor, wherein said output circuit comprises an image display device for displaying the moving images produced in the moving image mode for monitoring, and a data recording device for recording the still image, generated in said still image mode, into a recording medium.

5. The apparatus according to claim 1, wherein said apparatus is a digital camera including said imaging device.

6. A method of controlling imaging while driving an imaging device for photo-electrically converting an optical image formed by an imaging lens, receiving an image signal produced by the imaging device, and outputting moving images and a still image represented by the image signal, said method comprising the steps of:

storing defect information on defective pixels contained in the imaging device;

pre-processing of correlated-double-sampling the image signal to produce an analog image signal;

first signal processing of processing the analog image signal in accordance with an imaging operation mode, and converting the analog image signal processed to a digital image signal;

second signal processing of receiving the digital image signal, and processing the digital image signal in accordance with the imaging operation mode; and controlling processing in said steps of first and second signal processing to set up the imaging operation mode, said operation mode being one of a moving image mode in which the moving images are produced and a still image mode in which the still image is produced, and causing, accordance with the setup imaging operation mode, the moving images associated with the image signal to be output and the still image associated with the image signal to be output, wherein in the step of controlling the defective pixels in the image signal are recognized based on the defect information, and, based on the recognition result, said steps of first and second signal processing are controlled, in the step of first signal processing under the control of said step of controlling, a signal processing of previous-pixel value interpolation being performed in the moving image mode on the defective pixels in each color component to produce the digital image signal, in the step of second signal processing under the control of said step of controlling, in the still image mode, a value of a position of each of the defective pixels being calculated based on the values of the pixels in the vicinity of the defective pixel, the value of the defective pixel being replaced with the calculated result to thereby interpolate the digital image signal.

7. The method according to claim 6, wherein said step of first signal processing comprises the substeps of:

sampling, in response to a color separation pulse, the image signal produced in said step of pre-processing and separating the image signal into color component signals of each color component;

adjusting levels of the color component signals of each color component; and outputting the color component signals adjusted in level into a one-line signal, in said step of controlling, when the color of the defective pixel is going to be separated in the moving image mode, the color separation pulse inhibiting the sampling of the defective pixel being generated, in said step of first signal processing, when the color of the defective pixel is going to be separated, the previous pixel of the defective pixel being held in response to the color separation pulse generated in said step of controlling, and the held value being used as the value of the defective pixel.

8. The method according to claim 6, wherein said step of first signal processing comprises the substeps of:

sampling, in response to a color separation pulse, the image signal produced in said step of pre-processing, and separating the image signal into color component signals of each color component;

adjusting levels of the color component signals of each color component;

outputting the color component signals adjusted in level into a one-line signal;

sampling the one-line signal in response to a clock pulse; and converting a sampled value to a digital value to output the digital image signal, in the step of controlling, when the defective pixel is going to be converted in the moving image mode, the clock pulse for stopping the sampling of the defective pixel being generated, in said step of converting in the moving image mode, in response to the clock pulse, the sampling of the defective pixel being stopped, the held value of the previous pixel of the defective pixel being converted to the digital value to thereby produce the digital image signal converted.

* * * * *